C. L. Sheldon's
DEVICE FOR STIRRING MILK
72920
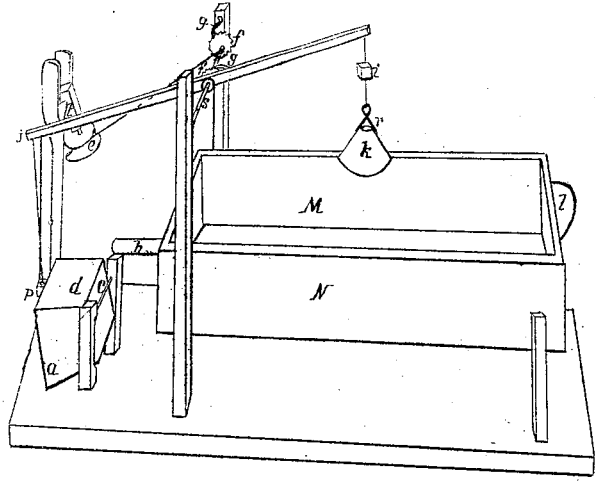
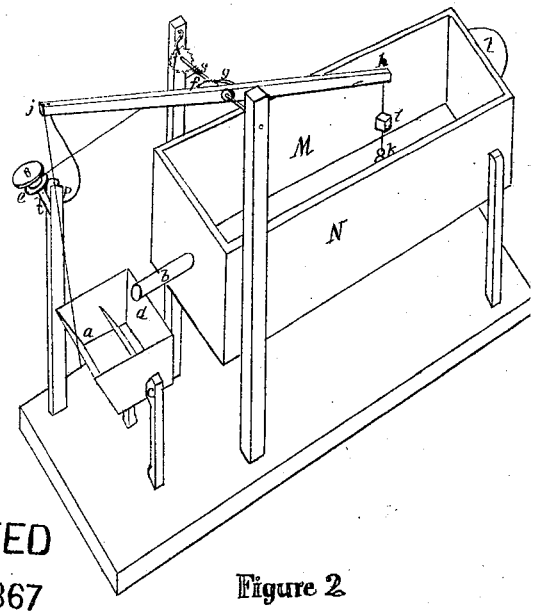
Figure 1.
PATENTED
DEC 31 1867
Figure 2.
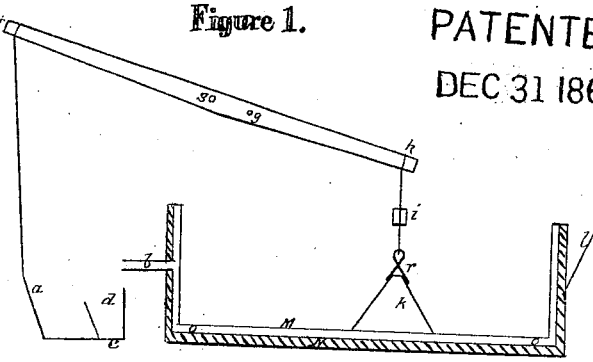
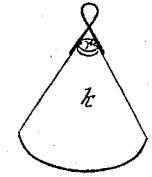
Figure 4.
Fig. 5
Figure 3.
Witnesses –
David T. Martin Jr.
Wm H Lawton
Inventor,
C. L. Sheldon

United States Patent Office.

C. L. SHELDON, OF LOWVILLE, NEW YORK.

Letters Patent No. 72,920, dated December 31, 1867.

---

IMPROVEMENT IN APPARATUS FOR COOLING MILK.

---

*The Schedule referred to in these Letters Patent and making part of the same.*

---

TO ALL WHOM IT MAY CONCERN:

Be it known that I, C. L. SHELDON, of Lowville, in the county of Lewis, and State of New York, have invented a new and useful Apparatus for the Purpose of Cooling Milk; and I do hereby declare that the following is a full, clear, and exact description of the construction and operation of the same, reference being had to the annexed drawings, making part of this specification, in which—

Figures 1 and 2 are perspective views.

Figure 3 a perspective view of plunger $k$ and valve $r$.

Figure 4 a vertical section, and

Figure 5 a perspective view of the tipping-shelf $t$.

$a\,d$ is a receptacle for water; $b$, tube by which $a\,d$ is supplied with water; $c$, wire forming pivots on which $a\,d$ turns; $e$, spool of tipping-shelf; $ff$, ratchet-wheels; $gg$, catches; $jh$, working-bar; $ip$, weights; $k$, plunger; $r$, valve of plunger; $l$, funnel; M, tin vat for milk; N, wooden vat for water; $oo$, space between tin and wooden vats; $s$, axle on which the bar $jh$ turns, and at the same time windlass to capsize the tipping-shelf; $t$, tipping-shelf.

The water-receiver may be made of wood or metal, and is constructed with a water-tight partition reaching nearly to the top of the receiver. Nearly under the centre of one of these compartments are the points of suspension, as at $c$. On the other side a cord is fastened, connecting with the working-bar at $j$. At the opposite end, $h$, of this working-bar, is suspended the weight $i$ and plunger $k$, of weight sufficient to bring the water-receiver, when empty, to a level position, as shown in fig. 2.

Water being introduced at $l$, fills the space $oo$, and, passing through the pipe $b$, is discharged into the compartment $d$ of the water-receiver. When this compartment is filled, the water runs into the next compartment, where, being wholly on one side of the points of suspension, the weight at the end $h$ of the working-bar is soon overbalanced, and the side $a$ of the receiver begins to tip down. As it descends, the water accumulated in compartment $d$ is discharged into compartment $a$, constantly adding to the momentum, and accelerating the descent until it begins to discharge from the second compartment. During this descent of the receiver, the plunger $k$, having a valve, $r$, on top, constructed with grooves to fit the supporting-wire, as shown in fig. 3, is pulled up through the milk, and the tendency to produce a vacuum causes the valve to close and retain the milk in the plunger, until brought above the mass of milk, when it falls, giving increased agitation to the entire vat of milk. The water being now discharged from the receiver, the weight $i$ and plunger descend, the valve $r$ rises, permitting the air to escape and the plunger to sink readily in the milk.

When it is desired to stop the agitation after the milk is cooled, and permit the cream to rise, the tipping-shelf $t$ is fixed, as shown in fig. 2, and the weight $p$ is put upon the shelf, as shown in fig. 5. The cord connecting the working-bar with $p$ is sufficiently long to allow the bar to work freely, without disengaging the weight from its shelf. The required amount of cord is wound around the spool $e$, and the connection made with the axle $s$. A the end $j$ of the working-bar descends, the catch $g$ on it, coming in contact with the ratchet-wheel near it, causes the axle $s$ to make part of a revolution, winding up a portion of the cord and unwinding the same amount from the spool $e$. As the end $j$ ascends, the catch in the opposite ratchet prevents the windlass moving backward, when, by the continued vibrations of the working-bar, the windlass is caused to revolve, until all the cord is unwound from the spool $e$, the shelf is caused to tip, as shown in fig. 1, sliding the weight $p$ from it, and causing the plunger to remain out of the milk.

What I claim as my invention, and desire to secure by Letters Patent, is—

1. The combination of the water-receiver $a\,d$ with the connecting-arms, and the valve $r$ attached to the plunger $k$, as and for the purpose specified.

2. The combination of the ratchet-wheels $ff$, the windlass $s$, the spool $e$, the tipping-shelf $t$, and weight $p$, as constructed and arranged for the purpose of stopping the agitation at any given time.

C. L. SHELDON.

Witnesses:
 DAVID T. MARTIN, Jr.,
 WM. H. LAWTON.